United States Patent
Chang

(10) Patent No.: US 9,849,716 B2
(45) Date of Patent: Dec. 26, 2017

(54) HOOK-AND-LOOP FASTENING STRUCTURE FOR CLIPBOARD

(71) Applicant: Jui-Chen Chang, Taipei (TW)

(72) Inventor: Jui-Chen Chang, Taipei (TW)

( * ) Notice: Subject to any disclaimer, the term of this patent is extended or adjusted under 35 U.S.C. 154(b) by 65 days.

(21) Appl. No.: 14/922,221

(22) Filed: Oct. 26, 2015

(65) Prior Publication Data

US 2017/0113482 A1    Apr. 27, 2017

(51) Int. Cl.
*B42F 9/00* (2006.01)
*F16M 1/00* (2006.01)
*F16B 1/00* (2006.01)

(52) U.S. Cl.
CPC .............. *B42F 9/008* (2013.01); *F16M 1/00* (2013.01); *F16B 2001/0028* (2013.01)

(58) Field of Classification Search
CPC ... A47B 23/042; A47B 23/043; A47B 23/044; B42F 9/001; B42F 9/008; F16B 1/00; F16B 2/08; F16B 2001/0028
USPC .......................................................... 24/306
See application file for complete search history.

(56) References Cited

U.S. PATENT DOCUMENTS

| | | | | |
|---|---|---|---|---|
| 4,645,163 A * | 2/1987 | Zovar | .................. | A47B 23/042 108/1 |
| 4,867,498 A * | 9/1989 | Delphia | .................... | B60R 7/04 224/311 |
| 5,884,889 A * | 3/1999 | Crosby | .................. | A47B 23/04 248/444 |
| 6,045,108 A * | 4/2000 | Cziraky | .................. | A47B 97/08 248/454 |
| D500,800 S * | 1/2005 | Shamoon | ........................ | D19/78 |
| D502,964 S * | 3/2005 | Cziraky | ........................ | D19/113 |
| 8,020,829 B1 * | 9/2011 | Tamayori | ............... | F16M 11/14 108/144.11 |
| D657,560 S * | 4/2012 | Schulz | ........................... | D19/88 |
| 8,857,618 B1 * | 10/2014 | Dennis | ..................... | A45C 9/00 206/575 |
| D753,765 S * | 4/2016 | Chuang | ......................... | D19/88 |
| 2002/0044819 A1 * | 4/2002 | Shamoon | ............ | B42F 13/0006 402/73 |
| 2003/0222542 A1 * | 12/2003 | Dunn | ...................... | B42F 9/001 312/100 |
| 2004/0256534 A1 * | 12/2004 | Phifer | .................. | A47B 23/042 248/460 |
| 2006/0011436 A1 * | 1/2006 | Orman | ..................... | A45C 3/02 190/100 |

(Continued)

*Primary Examiner* — Joshua Rodden

(57) ABSTRACT

A hook-and-loop fastening structure for a clipboard contains: a cover and an accommodation box rotatably connecting with the cover. The accommodation box includes an accommodating chamber, a fixing slot defined on one of two inner peripheral sides of the accommodating chamber, and two opposite insertion portions, wherein each insertion portion is arranged on each of two inner ends of the accommodating chamber. Each insertion portion has a recess and a through hole defined between and communicating with a bottom of the recess and the accommodating chamber. The fixing slot of the accommodating chamber is configured to house a clamper for clamping papers/documents, and a hook-and-loop fastener is connected with the two opposite insertion portions so as to fix an object (such as a mobile device or a tablet PC) in the clipboard, after inserting the hook-and-loop fastener into the recess and the through hole.

3 Claims, 8 Drawing Sheets

(56) References Cited

U.S. PATENT DOCUMENTS

2011/0155617 A1* 6/2011 Chang .................. B42F 7/14
 206/524.1
2012/0292312 A1* 11/2012 Chang .................. B42F 7/14
 220/4.24

* cited by examiner

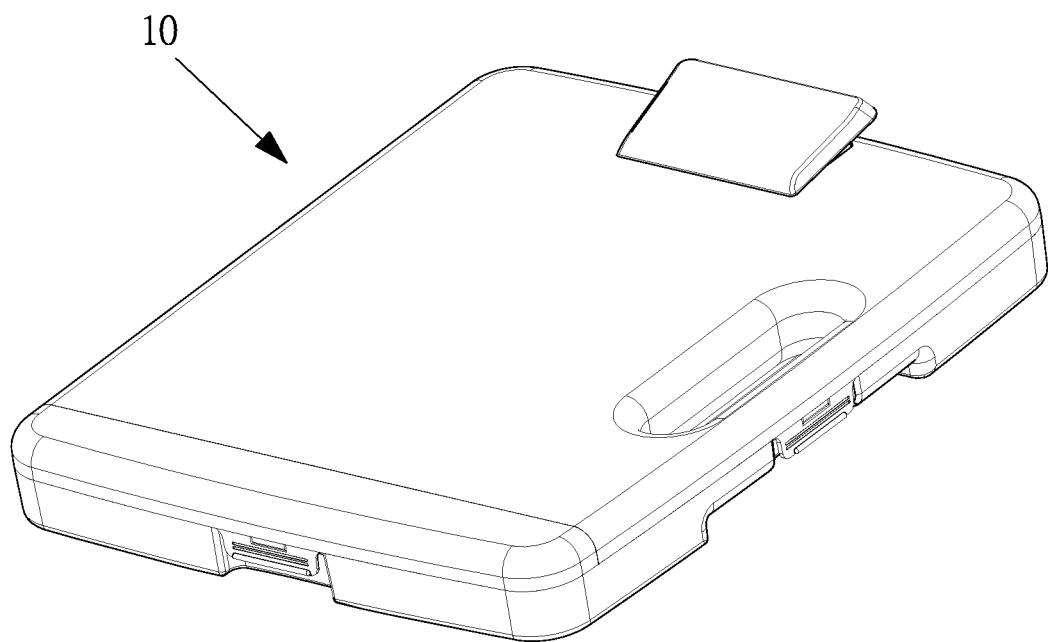
F I G.1

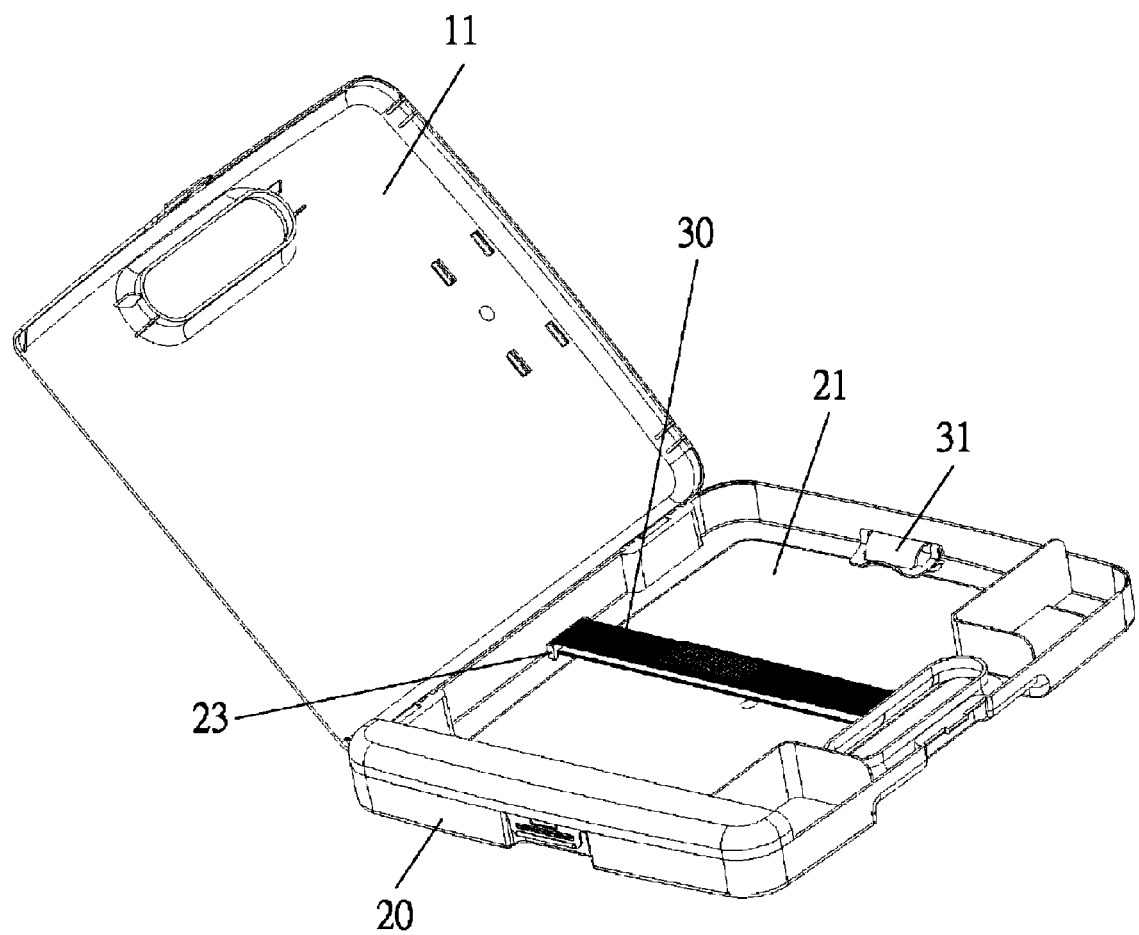
F I G. 4

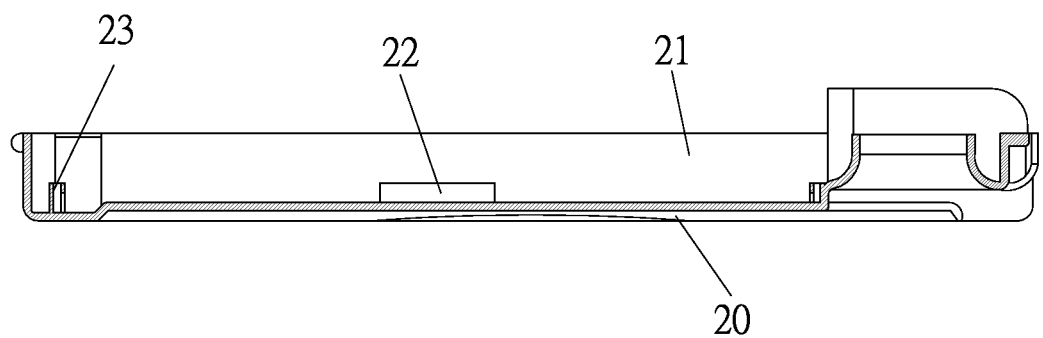
F I G. 5

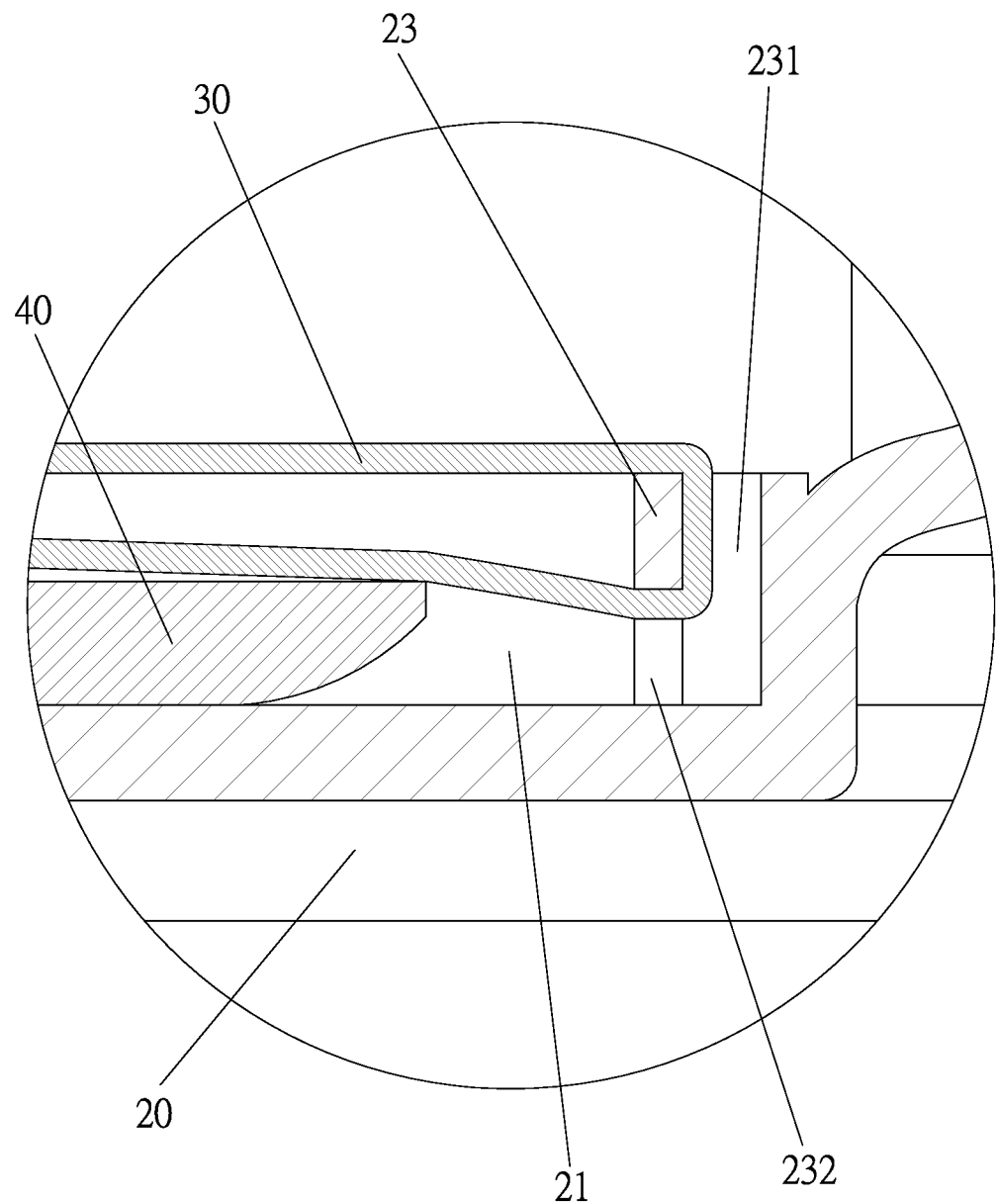
F I G. 6

HOOK-AND-LOOP FASTENING STRUCTURE FOR CLIPBOARD

FIELD OF THE INVENTION

The present invention relates to a hook-and-loop fastening structure for a clipboard which fastens an object (such as a mobile device or a tablet PC) in the clipboard securely.

BACKGROUND OF THE INVENTION

A conventional clipboard is configured to accommodate papers, documents, and a tablet PC. But the table PC cannot be fixed in an accommodating chamber of the clipboard securely.

The present invention has arisen to mitigate and/or obviate the afore-described disadvantages.

SUMMARY OF THE INVENTION

The primary objective of the present invention is to provide a hook-and-loop fastening structure for a clipboard which fastens an object (such as a mobile device or a tablet PC) in the clipboard securely.

To obtain above-mentioned objective, a hook-and-loop fastening structure for a clipboard provided by the present invention contains: a cover and an accommodation box rotatably connecting with the cover.

The accommodation box includes an accommodating chamber, a fixing slot defined on one of two inner peripheral sides of the accommodating chamber, and two opposite insertions portions. Each insertion portion is arranged on each of two inner ends of the accommodating chamber. Said each insertion portion has a recess and a through hole defined between and communicating with a bottom of the recess and the accommodating chamber.

The fixing slot of the accommodating chamber is configured to house a clamper for clamping papers/documents, and a hook-and-loop fastener is connected with the two opposite insertions portions so as to fix an object (such as a mobile device or a tablet PC) in the clipboard, after inserting the hook-and-loop fastener into the recess and the through hole.

BRIEF DESCRIPTION OF THE DRAWINGS

FIG. 1 is a perspective view showing the assembly of a hook-and-loop fastening structure for a clipboard according to a preferred embodiment of the present invention.

FIG. 4 is a perspective view showing the application of a hook-and-loop fastener of the hook-and-loop fastening structure for the clipboard according to the preferred embodiment of the present invention.

FIG. 5 is a cross sectional view showing the assembly of an accommodation box of the hook-and-loop fastener of the hook-and-loop fastening structure for the clipboard according to the preferred embodiment of the present invention.

FIG. 6 is a cross sectional view showing the assembly of a part of the hook-and-loop fastening structure for the clipboard according to the preferred embodiment of the present invention.

DETAILED DESCRIPTION OF THE PREFERRED EMBODIMENTS

Figure 2:
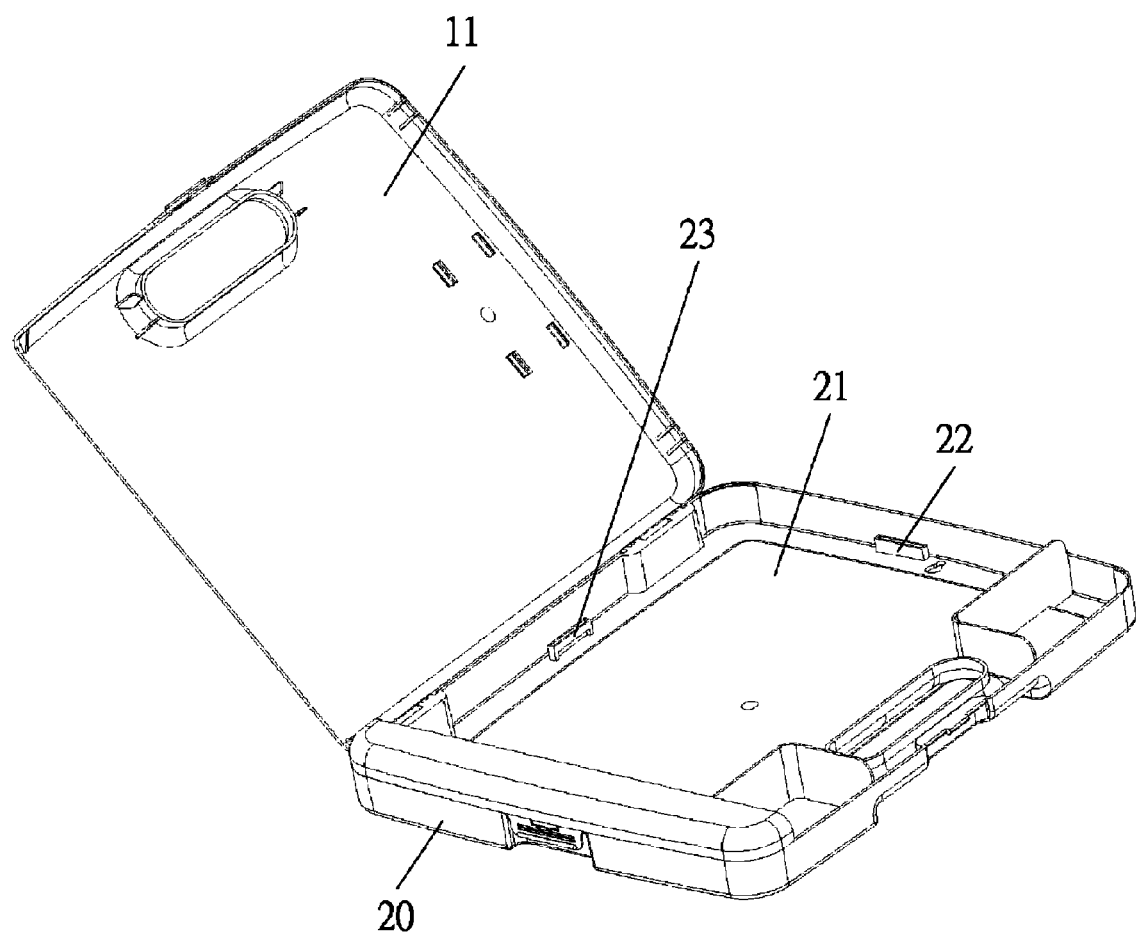
FIG. 2 is another perspective view showing the assembly of the hook-and-loop fastening structure for the clipboard according to the preferred embodiment of the present invention.
Figure 3:
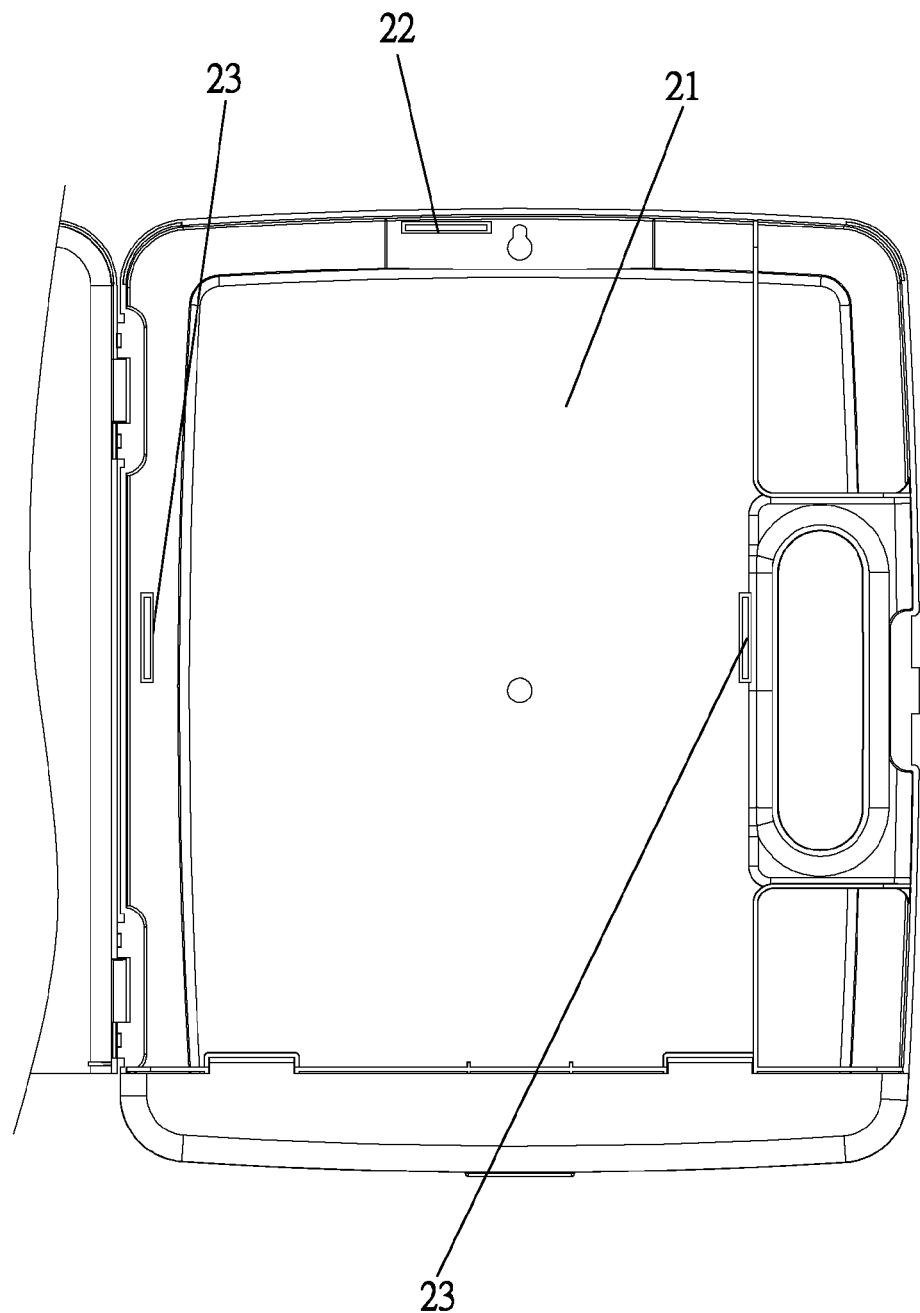
FIG. 3 is a top plane view showing the assembly of an accommodating chamber of the hook-and-loop fastening structure for the clipboard according to the preferred embodiment of the present invention.

With reference to FIGS. 1 to 3, a hook-and-loop fastening structure for a clipboard 10 according to a preferred embodiment of the present invention comprises: a cover 11 and an accommodation box 20, one of two outer ends of which rotatably connecting with the cover 11, wherein the accommodation box 20 includes an accommodating chamber 21, a fixing slot 22 defined on one of two inner peripheral sides of the accommodating chamber 21, and two opposite insertions portions 23, each insertion portion 23 is arranged on each of two inner ends of the accommodating chamber 21.

Referring further to FIGS. 4 to 6, said each insertion portion 23 has a recess 231 and a through hole 232 defined between and communicating with a bottom of the recess 231 and the accommodating chamber 21.

Figure 7:
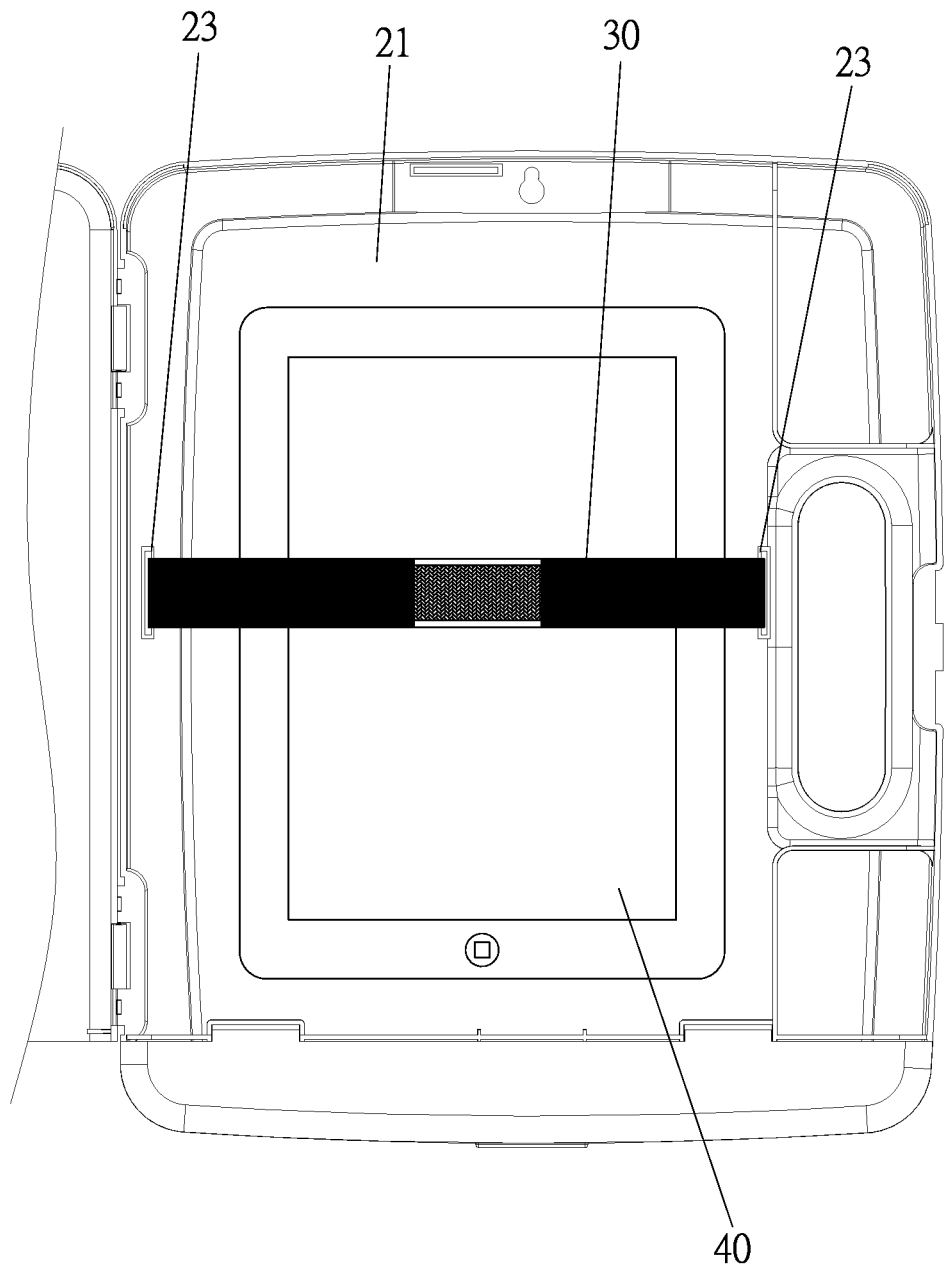
FIG. 7 is a top plane view showing the assembly of a part of the hook-and-loop fastening structure for the clipboard according to the preferred embodiment of the present invention.

As shown in FIGS. 4, 6 and 7, the fixing slot 22 of the accommodating chamber 21 is configured to house a clamper 31 for clamping papers/documents, and a hook-and-loop fastener 30 is connected with the two opposite insertions portions 23 so as to fix an object 40 (such as a mobile device or a tablet PC) in the clipboard 10, after inserting the hook-and-loop fastener 30 into the recess 231 and the through hole 232.

Figure 8:
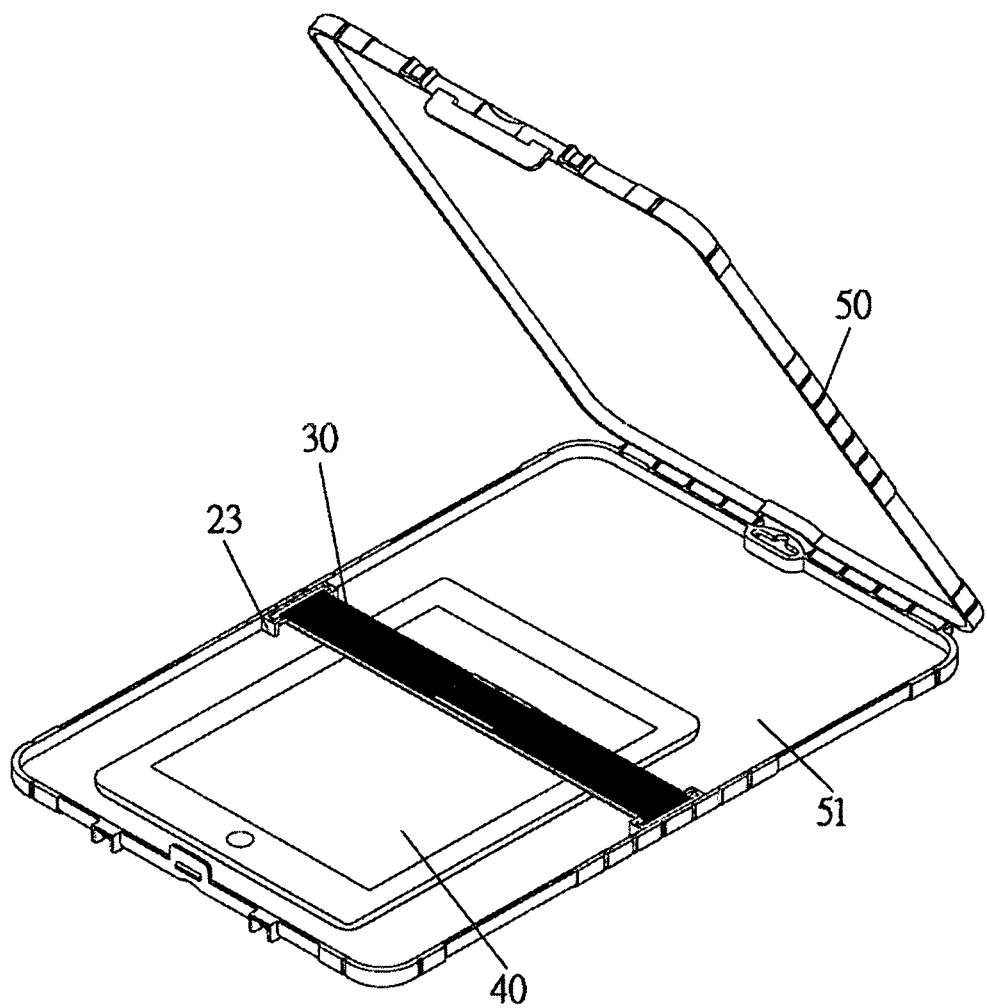
FIG. 8 is a perspective view showing the assembly of a hook-and-loop fastening structure for a clipboard according to another preferred embodiment of the present invention.

As shown in FIG. 8, in another embodiment, a clipboard 50 includes an accommodation chamber 51 and two opposite insertion portions 23, wherein each insertion portion 23 is arranged on each of two inner peripheral sides of the accommodating chamber 51, and a hook-and-loop fastener 30 is connected with the two opposite insertions portions 23 so as to clamp an object 40 (such as a mobile device or a tablet PC) in the clipboard 50.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A clipboard in combination with a hook-and-loop fastening structure, the clipboard in combination with the hook-and-loop fastening structure comprising: a cover and an accommodation box rotatably connecting with the cover;
wherein the accommodation box includes an accommodating chamber, a fixing slot defined on one of two inner peripheral sides of the accommodating chamber, and two opposite insertions portions inwardly extending to a central portion of the accommodating chamber from two inner ends of the accommodating chamber;
wherein each insertion portion has a recess and a through hole defined between and communicating with a bottom of the recess and the accommodating chamber;
wherein a hook-and-loop fastener is connected with the two opposite insertion portions so as to fix an object in the clipboard, after inserting the hook-and-loop fastener into the recess and the through hole.

2. The clipboard in combination with the hook-and-loop fastening structure as claimed in claim 1, wherein each insertion portion is arranged on each of the two inner ends of the accommodating chamber.

3. The clipboard in combination with the hook-and-loop fastening structure as claimed in claim 1, wherein the fixing slot of the accommodating chamber is configured to house a clamper for clamping papers/documents.

\* \* \* \* \*